United States Patent
Sharifi et al.

(10) Patent No.: US 11,557,278 B2
(45) Date of Patent: Jan. 17, 2023

(54) SPEAKER DEPENDENT FOLLOW UP ACTIONS AND WARM WORDS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 90 days.

(21) Appl. No.: 17/117,799

(22) Filed: Dec. 10, 2020

(65) Prior Publication Data
US 2022/0189465 A1    Jun. 16, 2022

(51) Int. Cl.
*G10L 15/07*     (2013.01)
*G10L 15/08*     (2006.01)
*G10L 15/22*     (2006.01)

(52) U.S. Cl.
CPC .............. *G10L 15/07* (2013.01); *G10L 15/08* (2013.01); *G10L 15/22* (2013.01); *G10L 2015/088* (2013.01)

(58) Field of Classification Search
CPC ......... G10L 15/07; G10L 15/08; G10L 15/22; G10L 2015/088
USPC ......................................................... 704/244
See application file for complete search history.

(56) References Cited

U.S. PATENT DOCUMENTS

| | | | |
|---|---|---|---|
| 8,386,251 B2* | 2/2013 | Strom | G10L 15/32 379/406.01 |
| 10,365,887 B1* | 7/2019 | Mulherkar | G06F 3/167 |
| 2007/0022006 A1* | 1/2007 | Lynn | G06F 16/955 705/14.4 |
| 2011/0145000 A1* | 6/2011 | Hoepken | G10L 15/22 704/275 |
| 2014/0184514 A1* | 7/2014 | Rao | G06F 3/017 345/156 |
| 2014/0343949 A1* | 11/2014 | Huang | H04R 3/00 704/275 |
| 2015/0161990 A1* | 6/2015 | Sharifi | G10L 15/063 704/251 |
| 2015/0199961 A1* | 7/2015 | Arkko | G06F 3/167 704/251 |
| 2016/0071516 A1* | 3/2016 | Lee | G10L 15/18 704/251 |
| 2016/0179831 A1* | 6/2016 | Gruber | G06F 40/42 704/235 |

(Continued)

*Primary Examiner* — Thuykhanh Le
(74) *Attorney, Agent, or Firm* — Honigman LLP; Brett A. Krueger; Grant Griffith

(57) ABSTRACT

A method includes receiving audio data corresponding to an utterance spoken by a user that includes a command for a digital assistant to perform a long-standing operation, activating a set of one or more warm words associated with a respective action for controlling the long-standing operation, and associating the activated set of one or more warm words with only the user. While the digital assistant is performing the long-standing operation, the method includes receiving additional audio data corresponding to an additional utterance, identifying one of the warm words from the activated set of warm words, and performing speaker verification on the additional audio data. The method further includes performing the respective action associated with the identified one of the warm words for controlling the long-standing operation when the additional utterance was spoken by the same user that is associated with the activated set of one or more warm words.

26 Claims, 9 Drawing Sheets

(56) References Cited

U.S. PATENT DOCUMENTS

| | | | |
|---|---|---|---|
| 2017/0169817 A1* | 6/2017 | VanBlon | G10L 15/02 |
| 2018/0158453 A1* | 6/2018 | Campbell | G10L 15/22 |
| 2018/0182390 A1* | 6/2018 | Hughes | G10L 15/02 |
| 2019/0341057 A1* | 11/2019 | Zhang | G01N 21/8983 |
| 2020/0152206 A1* | 5/2020 | Shen | G10L 25/24 |
| 2020/0202869 A1* | 6/2020 | Wang | G10L 25/18 |
| 2020/0244650 A1* | 7/2020 | Burris | H04L 63/0861 |
| 2020/0287973 A1* | 9/2020 | Zhang | G10L 15/26 |
| 2020/0312315 A1* | 10/2020 | Li | G10L 15/22 |
| 2020/0336846 A1* | 10/2020 | Rohde | G10L 15/22 |
| 2020/0342855 A1* | 10/2020 | Casado | G10L 15/00 |
| 2020/0342857 A1* | 10/2020 | Moreno | G10L 15/20 |
| 2020/0342866 A1* | 10/2020 | Casado | G06F 3/165 |
| 2020/0342878 A1* | 10/2020 | Lee | G10L 17/00 |
| 2020/0365138 A1* | 11/2020 | Kim | G06F 3/167 |
| 2021/0157542 A1* | 5/2021 | De Assis | G06F 16/436 |
| 2021/0174794 A1* | 6/2021 | Mont-Reynaud | G06F 3/167 |
| 2021/0183367 A1* | 6/2021 | Sharifi | G10L 13/00 |
| 2021/0193151 A1* | 6/2021 | Song | G10L 17/06 |
| 2022/0093106 A1* | 3/2022 | Mosayyebpour Kaskari | G06N 7/005 |
| 2022/0108701 A1* | 4/2022 | Gupta | G06F 21/32 |
| 2022/0115011 A1* | 4/2022 | Sharifi | G10L 15/08 |
| 2022/0122612 A1* | 4/2022 | Fang | G10L 17/06 |
| 2022/0139391 A1* | 5/2022 | Trufinescu | G06F 9/453 704/275 |

* cited by examiner

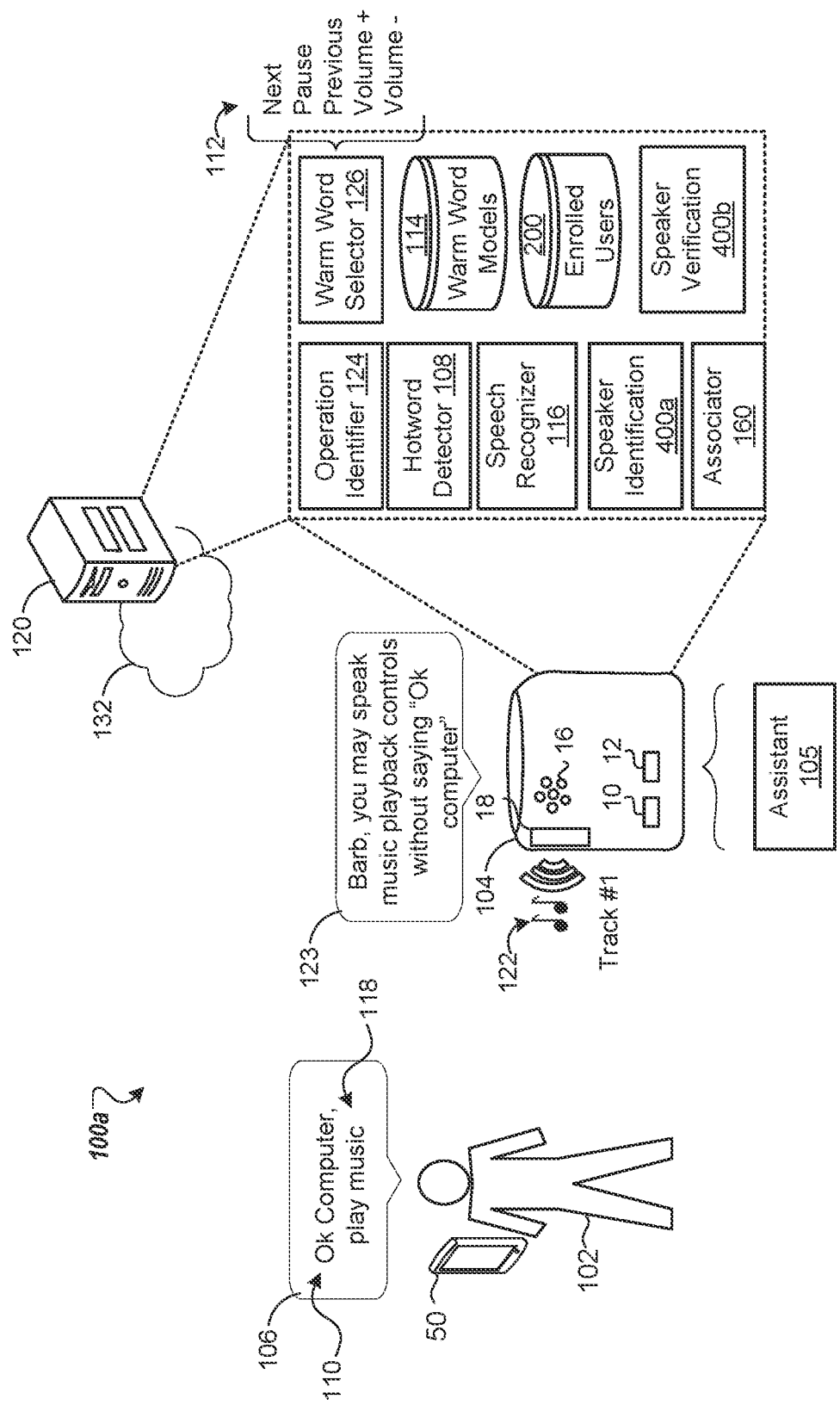

500

```
┌─────────────────────────────────────────────┐
│ Receiving audio data corresponding to an utterance │
│ spoken by a user that includes a command for a digital │
│ assistant to perform a long-standing operation  510 │
└─────────────────────────────────────────────┘
                        ↓
┌─────────────────────────────────────────────┐
│ Activating a set of one or more warm words associated │
│ with a respective action for controlling the long-standing │
│ operation; and associating the activated set of one or │
│ more warm words with only the user  520 │
└─────────────────────────────────────────────┘
                        ↓
┌─────────────────────────────────────────────┐
│ While the digital assistant is performing the long- │
│ standing operation, receiving additional audio data │
│ corresponding to an additional utterance, identifying one │
│ of the warm words from the activated set of one or more │
│ warm words, and performing speaker verification on the │
│ additional audio data  530 │
└─────────────────────────────────────────────┘
                        ↓
┌─────────────────────────────────────────────┐
│ Performing the respective action associated with the │
│ identified one of the warm words for controlling the long- │
│ standing operation when the additional utterance was │
│ spoken by the same user that is associated with the │
│ activated set of one or more warm words  540 │
└─────────────────────────────────────────────┘
```

FIG. 5

SPEAKER DEPENDENT FOLLOW UP ACTIONS AND WARM WORDS

TECHNICAL FIELD

This disclosure relates to speaker dependent follow up actions and warm words.

BACKGROUND

A speech-enabled environment permits a user to only speak a query or command out loud and a digital assistant will field and answer the query and/or cause the command to be performed. A speech-enabled environment (e.g., home, workplace, school, etc.) can be implemented using a network of connected microphone devices distributed throughout various rooms and/or areas of the environment. Through such a network of microphones, a user has the power to orally query the digital assistant from essentially anywhere in the environment without the need to have a computer or other device in front of him/her or even nearby. For example, while cooking in the kitchen, a user might ask the digital assistant "please set a timer for 20-minutes" and, in response, the digital assistant will confirm that the timer has been set (e.g., in a form of a synthesized voice output) and then alert (e.g., in the form of an alarm or other audible alert from an acoustic speaker) the user once the timer lapses after 20-minutes. Often, there are many users in a given environment that query/command the digital assistant to perform various actions. These users can register a voice profile with the digital assistant so that the users can be identified to provide a more personalized experience for each user. For instance, one of multiple different users of the digital assistant might speak the command "please play my music playlist", and in response, the digital assistant can identify the particular user by matching voice characteristics with the voice profile for that user and then stream the music playlist for that particular user through an acoustic speaker.

SUMMARY

One aspect of the disclosure provides a method for activating speaker-dependent warm words. The method includes receiving, at data processing hardware, audio data corresponding to an utterance spoken by a user and captured by an assistant-enabled device associated with the user. The utterance includes a command for a digital assistant to perform a long-standing operation. After receiving the audio data corresponding to the utterance, the method includes activating, by the data processing hardware, a set of one or more warm words each associated with a respective action for controlling the long-standing operation, and associating, by data processing hardware, the activated set of one or more warm words with only the user that spoke the utterance. While the digital assistant is performing the long-standing operation, the method also includes: receiving, at the data processing hardware, additional audio data corresponding to an additional utterance captured by the assistant-enabled device; identifying, by the data processing hardware, in the additional audio data, one of the warm words from the activated set of one or more warm words; and performing, by the data processing hardware, speaker verification on the additional audio data to determine whether the additional utterance was spoken by the same user that is associated with the activated set of one or more warm words. The method further includes performing, by data processing hardware, the respective action associated with the identified one of the warm words for controlling the long-standing operation when the additional utterance is spoken by the same user that is associated with the activated set of one or more warm words.

Implementations of the disclosure may include one or more of the following optional features. In some implementations, activating the set of one or more warm words includes activating, for each corresponding warm word in the activated set of one or more warm words, a respective warm word model to run on the assistant-enabled device associated with the user. In these implementations, identifying, in the additional audio data, the one of the warm words from the activated set of one or more warm words includes detecting, using the respective warm word model activated for the corresponding one of the warm words, the one of the warm words in the additional audio data without performing speech recognition on the additional audio data. Detecting the one of the warm words in the additional audio data may include: extracting audio features of the additional audio data; generating, using the respective warm word model activated for the corresponding one of the warm words, a warm word confidence score by processing the extracted audio features; and determining that the additional audio data corresponding to the additional utterance includes the corresponding one of the warm words when the warm word confidence score satisfies a warm word confidence threshold.

In some examples, activating the set of one or more warm words includes executing a speech recognizer on the assistant-enabled device. The speech recognizer is biased to recognize the one or more warm words in the activated set of one or more warm words. In these examples, identifying, in the additional audio data, the one of the warm words from the activated set of one or more warm words includes recognizing, using the speech recognizer executing on the assistant-enabled device, the one of the warm words in the additional audio data.

In some implementations, after receiving the audio data corresponding to the utterance spoken by the user, the method also includes performing, by the data processing hardware, speaker identification on the audio data to identify the user that spoke the utterance. The speaker identification includes extracting, from the audio data corresponding to the utterance spoken by the user, a first speaker-discriminative vector representing characteristics of the utterance spoken by the user, and determining whether the extracted speaker-discriminative vector matches any enrolled speaker vectors stored on the assistant-enabled device. Each enrolled speaker vector is associated with a different respective enrolled user of the assistant-enabled device. When the first speaker-discriminative vector matches one of the enrolled speaker vectors, the method includes identifying the user that spoke the utterance as the respective enrolled user associated with the one of the enrolled speaker vectors that matches the extracted speaker-discriminative vector. In these implementations, the utterance spoken by the user further includes a hotword preceding the command for the digital assistant to perform the long-standing operation; the first speaker-discriminative vector includes a text-dependent speaker-discriminative vector extracted from the portion of the audio data that includes the hotword; and each enrolled speaker vector includes a text-dependent enrolled speaker vector extracted from one or more audio samples of the respective enrolled user speaking the hotword. In additional implementations, performing the speaker verification on the additional audio data includes extracting, from the additional audio data corresponding to the additional utterance of the one of the warm words, a second speaker-discriminative vector representing characteristics of the additional utterance, and determining whether the second extracted speaker-discriminative vector matches a reference speaker vector for the respective enrolled user identified as the user that spoke the utterance. Here, when the extracted second speaker-discriminative vector matches the reference speaker vector, the method includes determining that the additional utterance was spoken by the same user that is associated with the activated set of one or more warm words. In these implementations, the reference speaker vector may include the enrolled speaker vector associated with the respective enrolled user. The reference speaker vector additionally or alternatively includes a text-dependent speaker vector extracted from one or more audio samples of the respective enrolled user speaking the identified one of the warm words.

In some examples, when the first speaker-discriminative vector does not match any of the enrolled speaker vectors, identifying the user that spoke the utterance as a guest user of the assistant-enabled device and performing the speaker verification on the additional audio data includes extracting, from the additional audio data, a second speaker-discriminative vector representing characteristics of the additional utterance and determining whether the second speaker-discriminative vector matches the first speaker-discriminative vector representing the characteristics. In these examples, the method includes determining that the additional utterance was spoken by the same user that is associated with the activated set of one or more warm words when the first and second extracted speaker-discriminative vectors match. In additional implementations, when the additional utterance was spoken by a different user than the user that is associated with the activated set of one or more warm words, the method includes suppressing, by the data processing hardware, performance of the respective action associated with the identified one of the warm words for controlling the long-standing operation.

In some examples, when the additional utterance was spoken by a different user than the user that is associated with the activated set of one or more warm words, the method includes prompting, by the data processing hardware, the user that is associated with the activated set of one or more warm words to authorize performance of the respective action associated with the identified one of the warm words for controlling the long-standing operation. The method also includes receiving, at the data processing hardware, an acknowledgement from the user authorizing performance of the respective action and performing, by the data processing hardware, the respective action associated with the identified one of the warm words for controlling the long-standing operation. Prompting the user may include identifying the different user that spoke the additional utterance. In some implementations, the method further includes determining, by the data processing hardware, when the digital assistant stops performing the long-standing operation and deactivating, by the data processing hardware, the set of one or more warm words.

Another aspect of the disclosure provides a system for activating speaker-dependent warm words. The system includes data processing hardware and memory hardware in communication with the data processing hardware. The memory hardware stores instructions that when executed by the data processing hardware cause the data processing hardware to perform operations that include receiving audio data corresponding to an utterance spoken by a user and captured by an assistant-enabled device associated with the user. The utterance includes a command for a digital assistant to perform a long-standing operation. After receiving the audio data corresponding to the utterance, the operations include activating a set of one or more warm words each associated with a respective action for controlling the long-standing operation, and associating the activated set of one or more warm words with only the user that spoke the utterance. While the digital assistant is performing the long-standing operation, the operations also include: receiving additional audio data corresponding to an additional utterance captured by the assistant-enabled device; identifying, in the additional audio data, one of the warm words from the activated set of one or more warm words; and performing speaker verification on the additional audio data to determine whether the additional utterance was spoken by the same user that is associated with the activated set of one or more warm words. The operations further include performing the respective action associated with the identified one of the warm words for controlling the long-standing operation when the additional utterance is spoken by the same user that is associated with the activated set of one or more warm words.

Implementations of the disclosure may include one or more of the following optional features. In some implementations, activating the set of one or more warm words includes activating, for each corresponding warm word in the activated set of one or more warm words, a respective warm word model to run on the assistant-enabled device associated with the user. In these implementations, identifying, in the additional audio data, the one of the warm words from the activated set of one or more warm words includes detecting, using the respective warm word model activated for the corresponding one of the warm words, the one of the warm words in the additional audio data without performing speech recognition on the additional audio data. Detecting the one of the warm words in the additional audio data may include extracting audio features of the additional audio data; generating, using the respective warm word model activated for the corresponding one of the warm words, a warm word confidence score by processing the extracted audio features; and determining that the additional audio data corresponding to the additional utterance includes the corresponding one of the warm words when the warm word confidence score satisfies a warm word confidence threshold.

In some examples, activating the set of one or more warm words includes executing a speech recognizer on the assistant-enabled device. The speech recognizer is biased to recognize the one or more warm words in the activated set of one or more warm words. In these examples, identifying, in the additional audio data, the one of the warm words from the activated set of one or more warm words includes recognizing, using the speech recognizer executing on the assistant-enabled device, the one of the warm words in the additional audio data.

In some implementations, the operations further include, after receiving the audio data corresponding to the utterance spoken by the user, performing speaker identification on the audio data to identify the user that spoke the utterance. The speaker identification includes extracting, from the audio data corresponding to the utterance spoken by the user, a first speaker-discriminative vector representing characteristics of the utterance spoken by the user, and determining whether the extracted speaker-discriminative vector matches any enrolled speaker vectors stored on the assistant-enabled device. Each enrolled speaker vector is associated with a different respective enrolled user of the assistant-enabled device. When the first speaker-discriminative vector matches one of the enrolled speaker vectors, the operations include identifying the user that spoke the utterance as the respective enrolled user associated with the one of the enrolled speaker vectors that matches the extracted speaker-discriminative vector. In these implementations, the utterance spoken by the user further includes a hotword preceding the command for the digital assistant to perform the long-standing operation; the first speaker-discriminative vector includes a text-dependent speaker-discriminative vector extracted from the portion of the audio data that includes the hotword; and each enrolled speaker vector includes a text-dependent enrolled speaker vector extracted from one or more audio samples of the respective enrolled user speaking the hotword. In additional implementations, performing the speaker verification on the additional audio data includes extracting, from the additional audio data corresponding to the additional utterance of the one of the warm words, a second speaker-discriminative vector representing characteristics of the additional utterance, and determining whether the second extracted speaker-discriminative vector matches a reference speaker vector for the respective enrolled user identified as the user that spoke the utterance. Here, when the extracted second speaker-discriminative vector matches the reference speaker vector, the operations include determining that the additional utterance was spoken by the same user that is associated with the activated set of one or more warm words. In these implementations, the reference speaker vector may include the enrolled speaker vector associated with the respective enrolled user. The reference speaker vector additionally or alternatively includes a text-dependent speaker vector extracted from one or more audio samples of the respective enrolled user speaking the identified one of the warm words.

In some examples, when the first speaker-discriminative vector does not match any of the enrolled speaker vectors, identifying the user that spoke the utterance as a guest user of the assistant-enabled device and performing the speaker verification on the additional audio data includes extracting, from the additional audio data, a second speaker-discriminative vector representing characteristics of the additional utterance and determining whether the second speaker-discriminative vector matches the first speaker-discriminative vector representing the characteristics. In these examples, the operations include determining that the additional utterance was spoken by the same user that is associated with the activated set of one or more warm words when the first and second extracted speaker-discriminative vectors match. In additional implementations, when the additional utterance was spoken by a different user than the user that is associated with the activated set of one or more warm words, the operations include suppressing performance of the respective action associated with the identified one of the warm words for controlling the long-standing operation.

In some examples, when the additional utterance was spoken by a different user than the user that is associated with the activated set of one or more warm words, the operations include prompting the user that is associated with the activated set of one or more warm words to authorize performance of the respective action associated with the identified one of the warm words for controlling the long-standing operation. The operations also include receiving an acknowledgment from the user authorizing performance of the respective action and performing the respective action associated with the identified one of the warm words for controlling the long-standing operation. Prompting the user may include identifying the different user that spoke the additional utterance. In some implementations, the operations further include determining when the digital assistant stops performing the long-standing operation and deactivating the set of one or more warm words.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 1A-1C are schematic views of an example system including a user controlling a long-standing operation using speaker-dependent warm words.

FIG. 5 is a flowchart of an example arrangement of operations for a method for activating speaker-dependent warm words.

Like reference symbols in the various drawings indicate like elements.

DETAILED DESCRIPTION

Figure 1B:
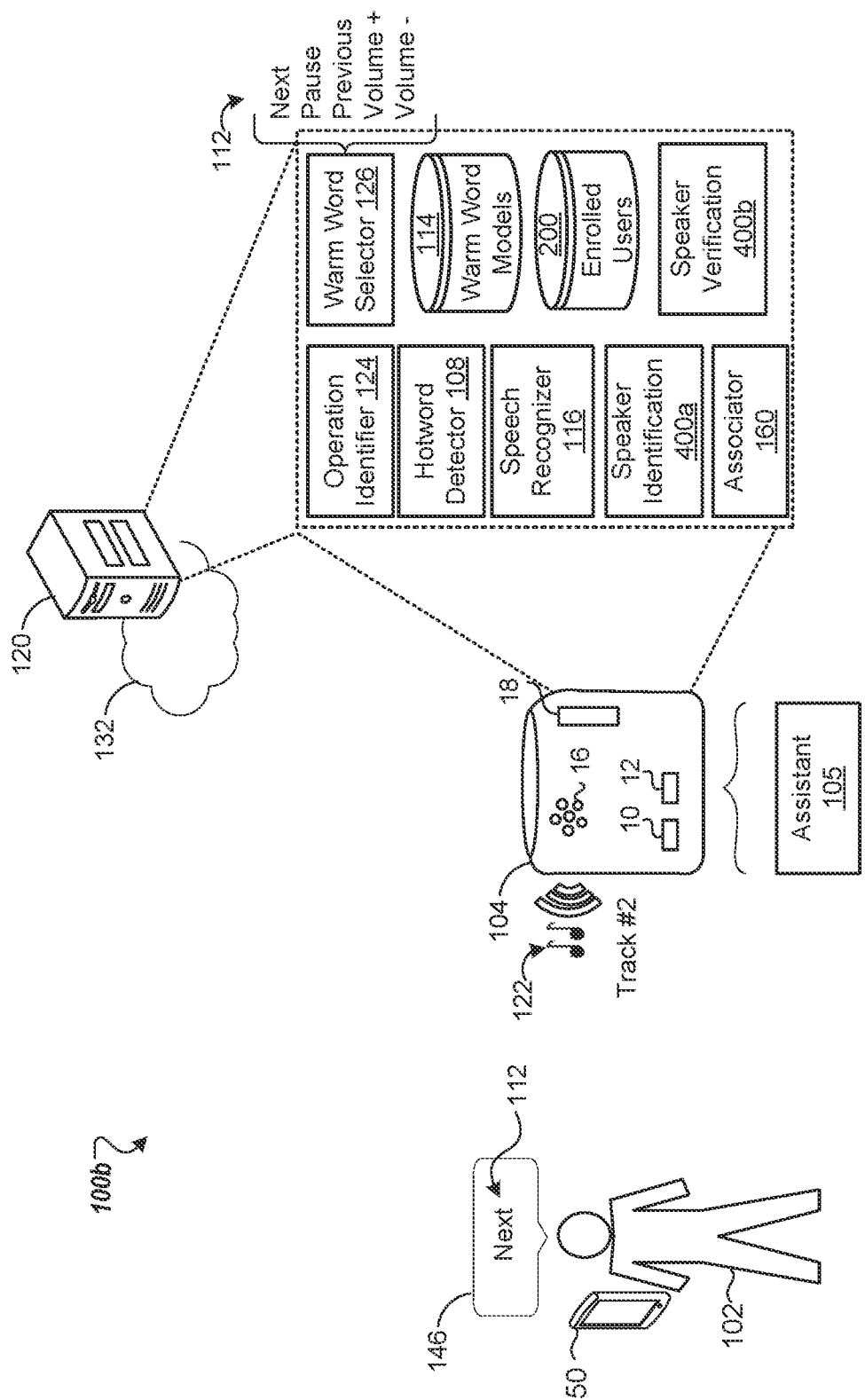

A user's manner of interacting with an assistant-enabled device is designed to be primarily, if not exclusively, by means of voice input. Consequently, the assistant-enabled device must have some way of discerning when any given utterance in a surrounding environment is directed toward the device as opposed to being directed to an individual in the environment or originating from a non-human source (e.g., a television or music player). One way to accomplish this is to use a hotword, which by agreement among the users in the environment, is reserved as a predetermined word(s) that is spoken to invoke the attention of the device. In an example environment, the hotword used to invoke the assistant's attention are the words "OK computer." Consequently, each time the words "OK computer" are spoken, it is picked up by a microphone, conveyed to a hotword detector, which performs speech understanding techniques to determine whether the hotword was spoken and, if so, awaits an ensuing command or query. Accordingly, utterances directed at an assistant-enabled device take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

In cases where the user provides several hotword based commands to an assistant-enabled device, such as a mobile phone or smart speaker, the user's interaction with the phone or speaker may become awkward. The user may speak, "Ok computer, play my homework playlist." The phone or speaker may begin to play the first song on the playlist. The user may wish to advance to the next song and speak, "Ok computer, next." To advance to yet another song, the user may speak, "Ok computer, next," again. To alleviate the need to keep repeating the hotword before speaking a command, the assistant-enabled device may be configured to recognize/detect a narrow set of hotphrases or warm words to directly trigger respective actions. In the example, the warm word "next" serves the dual purpose of a hotword and a command so that the user can simply utter "next" to invoke the assistant-enabled device to trigger performance of the respective action instead of uttering "Ok computer, next."

A set of warm words can be active for controlling a long-standing operation. As used herein, a long-standing operation refers to an application or event that a digital assistant performs for an extended duration and one that can be controlled by the user while the application or event is in progress. For instance, when a digital assistant sets a timer for 30-minutes, the timer is a long-standing operation from the time of setting the timer until the timer ends or a resulting alert is acknowledged after the timer ends. In this instance, warm word such as "stop timer" could be active to allow the user to stop the timer by simply speaking "stop timer" without first speaking the hotword. Likewise, a command instructing the digital assistant to play music from a streaming music service is a long-standing operation while the digital assistant is streaming music from the streaming music service through a playback device. In this instance, an active set of warm words can be "pause", "pause music", "volume up", "volume down", "next", "previous", etc., for controlling playback of the music the digital assistant is streaming through the playback device. The long-standing operation may include multi-step dialogue queries such as "book a restaurant" in which different sets of warm words will be active depending on a given stage of the multi-step dialogue. For instance, the digital assistant 105 may prompt a user to select from a list of restaurants, whereby a set of warm words may become active that each include a respective identifier (e.g., restaurant name or number in list) for selecting a restaurant from the list and complete the action of booking a reservation for that restaurant.

One challenge with warm words is limiting the number of words/phrases that are simultaneously active so that quality and efficiency is not degraded. For instance, a number of false positives indicating when the assistant-enabled device incorrectly detected/recognized one of the active words greatly increases the larger the number of warm words that are simultaneously active. Moreover a user that seeds a command to initiate a long-running operation cannot prevent others from speaking active warm words for controlling the long-running operation.

Implementations herein are directed toward activating a set of one or more warm words associated with a long-standing operation in progress that are speaker-dependent on a user that spoke a command for a digital assistant to perform the long-standing operations. That is, the warm words that are active are associated with a high likelihood of being spoken by the user after the initial command for controlling the long-standing operation. As such, while digital assistant is performing the long-standing operations commanded by the user, only the user is authorized to speak any of the active warm words to trigger a respective action for controlling the long-standing operation. That is, if someone other than the user speaks one of the warm words, performance of the respective action for controlling the long-stranding operation will be suppressed, or require approval by the user. Stated differently, any processing of warm words captured in streaming audio is limited to the voice of the user that issued the initial command for the digital assistant to perform the long-standing operation. A warm word detector and speaker identification may run on the assistant-enabled device and consume low power.

By associating active warm words with a voice of a particular user so that the warm words are speaker dependent, accuracy in triggering respective actions upon detecting the warm words is improved since only the particular user is permitted to speak the warm words. Additionally, processing costs are improved since a number of times the assistant-enabled device wakes-up and potentially connects to a server reduces, as well as the number of false positives are reduced. Moreover, a user's experience with the digital assistant improves since the user's command to initiate performance of the long-standing operation cannot be overridden by others, unless explicit permission by the user is provided.

FIGS. 1A and 1B illustrate example systems 100a, 100b for activating warm words associated with respective actions for controlling a long-standing operation and associating the warm words 112 with a user 102 that spoke an initial command for controlling the long-standing operation. Briefly, and as described in more detail below, an assistant-enabled device 104 begins to play music 122 in response to an utterance 106, "Ok computer, play music," spoken by the user 102. While the assistant-enabled device 104 is performing the long-standing operation of the music 122 as playback audio from a speaker 18, the assistant-enabled device 104 is able to detect/recognize an active warm word 112 of "next" that is spoken by the user 102 as an action to control the long-standing operation, e.g., an instruction to advance to the next song in a playlist associated with the music 122.

The systems 100a, 100b include the assistant-enabled device (AED) 104 executing a digital assistant 105 that the user 102 may interact with through speech. In the example shown, the AED 104 corresponds to a smart speaker. However, the AED 104 can include other computing devices, such as, without limitation, a smart phone, tablet, smart display, desktop/laptop, smart watch, smart appliance, headphones, or vehicle infotainment device. The AED 104 includes data processing hardware 10 and memory hardware 12 storing instructions that when executed on the data processing hardware 10 cause the data processing hardware 10 to perform operations. The AED 104 includes an array of one or more microphones 16 configured to capture acoustic sounds such as speech directed toward the AED 104. The AED 104 may also include, or be in communication with, an audio output device (e.g., speaker) 18 that may output audio such as music 122 and/or synthesized speech from the digital assistant 105, FIG. 1A shows the user 102 speaking an utterance 106, "Ok computer, play music" in the vicinity of the AED 104. The microphone 16 of the AED 104 receives the utterance 106 and processes the audio data 402 that corresponds to the utterance 106. The initial processing of the audio data 402 may involve filtering the audio data 402 and converting the audio data 402 from an analog signal to a digital signal. As the AED 104 processes the audio data 402, the AED may store the audio data 402 in a buffer of the memory hardware 12 for additional processing. With the audio data 402 in the buffer, the AED 104 may use a hotword detector 108 to detect whether the audio data 402 includes the hotword. The hotword detector 108 is configured to identify hotwords that are included in the audio data 402 without performing speech recognition on the audio data 402.

In some implementations, the hotword detector 108 is configured to identify hotwords that are in the initial portion of the utterance 106. In this example, the hotword detector 108 may determine that the utterance 106 "Ok computer, play music" includes the hotword 110 "ok computer" if the hotword detector 108 detects acoustic features in the audio data 402 that are characteristic of the hotword 110. The acoustic features may be mel-frequency cepstral coefficients (MFCCs) that are representations of short-term power spectrums of the utterance 106 or may be mel-scale filterbank energies for the utterance 106. For example, the hotword detector 108 may detect that the utterance 106 "Ok computer, play music" includes the hotword 110 "ok computer" based on generating MFCCs from the audio data 402 and classifying that the MFCCs include MFCCs that are similar to MFCCs that are characteristic of the hotword "ok computer" as stored in a hotword model of the hotword detector 108. As another example, the hotword detector 108 may detect that the utterance 106 "Ok computer, play music" includes the hotword 110 "ok computer" based on generating mel-scale filterbank energies from the audio data 402 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the audio data 402 that corresponds to the utterance 106 includes the hotword 110, the AED 104 may trigger a wake-up process to initiate speech recognition on the audio data 402 that corresponds to the utterance 106. For example, a speech recognizer 116 running on the AED 104 may perform speech recognition or semantic interpretation on the audio data 402 that corresponds to the utterance 106. The speech recognizer 116 may perform speech recognition on the portion of the audio data 402 that follows the hotword 110. In this example, the speech recognizer 116 may identify the words "play music" in the command 118.

In some implementations, the speech recognizer 116 is located on a server 120 in addition to, or in lieu, of the AED 104. Upon the hotword detector 108 triggering the AED 104 to wake-up responsive to detecting the hotword 110 in the utterance 106, the AED 104 may transmit the audio data 402 corresponding to the utterance 106 to the server 120 via a network 132. The AED 104 may transmit the portion of the audio data 402 that includes the hotword 110 for the server 120 to confirm the presence of the hotword 110. Alternatively, the AED 104 may transmit only the portion of the audio data 402 that corresponds to the portion of the utterance 106 after the hotword 110 to the server 120. The server 120 executes the speech recognizer 116 to perform speech recognition and returns a transcription of the audio data 402 to the AED 104. In turn, the AED 104 identifies the words in the utterance 106, and the AED 104 performs semantic interpretation and identifies any speech commands. The AED 104 (and/or the server 120) may identify the command for the digital assistant 105 to perform the long-standing operation of "play music". In the example shown, the digital assistant 105 begins to perform the long-standing operation of playing music 122 as playback audio from the speaker 18 of the AED 104. The digital assistant 105 may stream the music 122 from a streaming service (not shown) or the digital assistant 105 may instruct the AED 104 to play music stored on the AED 104.

The AED 104 (and/or the server 120) may include an operation identifier 124 and a warm word selector 126. The operation identifier 124 may be configured to identify one or more long-standing operations the digital assistant 105 is currently performing. For each long-standing operation the digital assistant 105 is currently performing, the warm word selector 126 may select a corresponding set of one or more warm words 112 each associated with a respective action for controlling the long-standing operation. In some examples, the warm word selector 126 accesses a registry or table (e.g., stored on the memory hardware 12) that associates the identified long-standing operation with a corresponding set of one or more warm words 112 that are highly correlated with the long-standing operation. For example, if the long-standing operation corresponds to a set timer function, the associated set of one or more warm words 112 available the warm word selector 126 to activate includes the warm word 112 "stop timer" for instructing the digital assistant 105 to stop the timer. Similarly, for the long-standing operation of "Call [contact name]" the associated set of warm words 112 includes a "hang up" and/or "end call" warm word(s) 112 for ending the call in progress. In the example shown, for the long-standing operation of playing music 122, the associated set of one or more warm words 112 available for the warm word selector 126 to activate includes the warm words 112 "next", "pause", "previous", "volume up", and "volume down" each associated with the respective action for controlling playback of the music 122 from the speaker 18 of the AED 104. Accordingly, the warm word selector 126 activates these warm words 112 while the digital assistant 105 is performing the long-standing operation and may deactivate these warm words 112 once the long-standing operation ends. Similarly, different warm words 112 may activate/deactivate depending on a state of the long-standing operation in progress. For example, if the user speaks "pause" to pause the playback of music 122, the warm word selector 126 may activate a warm word 112 for "play" to resume the playback of the music 122. In some configurations, instead of accessing a registry, the warm word selector 126 examines code associated with an application of the long-standing operation (e.g., a music application running in the foreground or background of the AED 104) to identify any warm words 112 that developers of the application want users 102 to be able to speak to interact with the application and the respective actions for each warm word 112. The warm words 112 in the registry may also relate to follow-up queries that the user 102 (or typical users) tend to issue following the given query, e.g., "Ok computer, next track".

In some implementations, after activating the set of one or more warm words 112 correlated to the long-standing operation, an associator 160 executing on the AED 104 (or the server 120) associates the activated set of one or more warm words 112 with only the user 102 that spoke the utterance 106 with the command 118 for the digital assistant 105 to perform the long-standing operation. That is, the associator 160 configures the activated set of warm words 112 to be dependent on a speaking voice of the particular user 102 that provided the initial command 118 to initiate the long-standing operation. As will become apparent, by depending the activated set of warm words 112 on the speaking voice of the particular user 102, the AED 104 (e.g., via the digital assistant 105 will only perform the respective action associated with one of the active warm words 112 when the active warm word is spoken by the particular user 102, and thereby suppress performance (or at least require approval from the particular user 102) of the respective action when the warm word 112 is spoken by a different speaker.

In order for the associator 160 to associate the activated set of one or more warm words 112 with only the user 102 that spoke the utterance 106 initiating the command 118, the associator 160 must first resolve an identity of the user 102 that spoke the utterance 106. In some scenarios, the user 102 is identified as an enrolled user 200 of the AED 104 that is authorized to access or control various functions of the AED 104 and digital assistant 105. The AED 104 may have multiple different enrolled users 200 each having registered user accounts indicating particular permissions or rights regarding functionality of the AED 104. For instance, the AED 104 may operate in a multi-user environment such as a household with multiple family members, whereby each family member corresponds to an enrolled user 200 having permissions for accessing a different respective set of resources. To illustrate, a father speaking the command "play my music playlist" would result in the digital assistant 105 streaming music from a rock music playlist associated with the father, as opposed to a different music playlists created by, and associated with, another enrolled user 200 of the household such as a teenage daughter whose playlist includes pop music.

Figure 2:
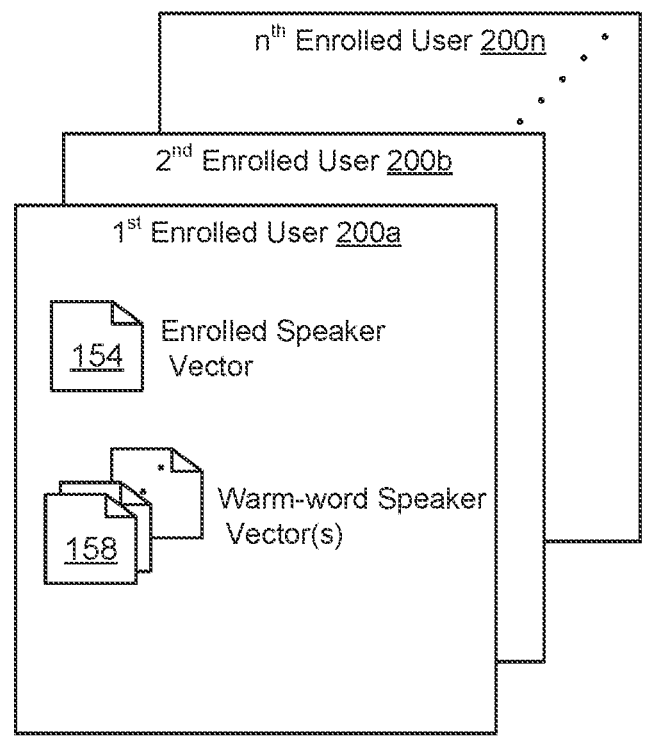
FIG. 2 is an example data store storing enrolled user data.

FIG. 2 shows an example data store storing enrolled user data/information for each of multiple enrolled users 200a-n of the AED 104. Here, each enrolled user 200 of the AED 104 may undertake a voice enrollment process to obtain a respective enrolled speaker vector 154 from audio samples of multiple enrollment phrases spoken by the enrolled user 200. For example, a speaker-discriminative model 410 (FIGS. 4A and 4B) may generate one or more enrolled speaker vectors 154 from the audio samples of enrollment phrases spoken by each enrolled user 200 that may be combined, e.g., averaged or otherwise accumulated, to form the respective enrolled speaker vector 154. One or more of the enrolled users 200 may use the AED 104 to conduct the voice enrollment process, where the microphone 16 captures the audio samples of these users speaking the enrollment utterances and the speaker-discriminative model 410 generates the respective enrolled speaker vectors 154 therefrom. The model 410 may execute on the AED 104 the server 120, or a combination thereof. Additionally, one or more of the enrolled users 200 may enroll with the AED 104 by providing authorization and authentication credentials to an existing user account with the AED 104. Here, the existing user account may store enrolled speaker vectors 154 obtained from a previous voice enrollment process with another device also linked to the user account.

In some examples, the enrolled speaker vector 154 for an enrolled user 200 includes a text-dependent enrolled speaker vector. For instance, the text-dependent enrolled speaker vector may be extracted from one or more audio samples of the respective enrolled user 200 speaking a predetermined term such as the hotword 110 (e.g., "Ok computer") used for invoking the AED 104 to wake-up from a sleep state. In other examples, the enrolled speaker vector 154 for an enrolled user 200 is text-independent obtained from one or more audio samples of the respective enrolled user 200 speaking phrases with different terms/words and of different lengths. In these examples, the text-independent enrolled speaker vector may be obtained over time from audio samples obtained from speech interactions the user 102 has with the AED 104 or other device linked to the same account.

FIG. 2 also shows the AED 104 (and/or server 120) optionally storing one or more other text-dependent speaker vectors 158 each extracted from one or more audio samples of the respective enrolled user 200 speaking a specific term or phrase. For example, the enrolled user 200a may include a respective text-dependent speaker vector 158 for each of one or more warm words 112 that, when active, may be spoken to cause the AED 104 to perform a respective action for controlling a long-standing operation or perform some other command. Accordingly, a text-dependent speaker vector 158 for a respective enrolled user 200 represents speech characteristics of the respective enrolled user 200 speaking the specific warm word 112. Described in greater detail below with reference to FIG. 4B, the text-dependent speaker vector 158 stored for a respective enrolled user 200 that is associated with a specific warm word 112 may be used to verify the respective enrolled user 200 speaking the specific warm word 112 to command the AED 104 to perform an action for controlling a long-standing operation.

Figure 4A:
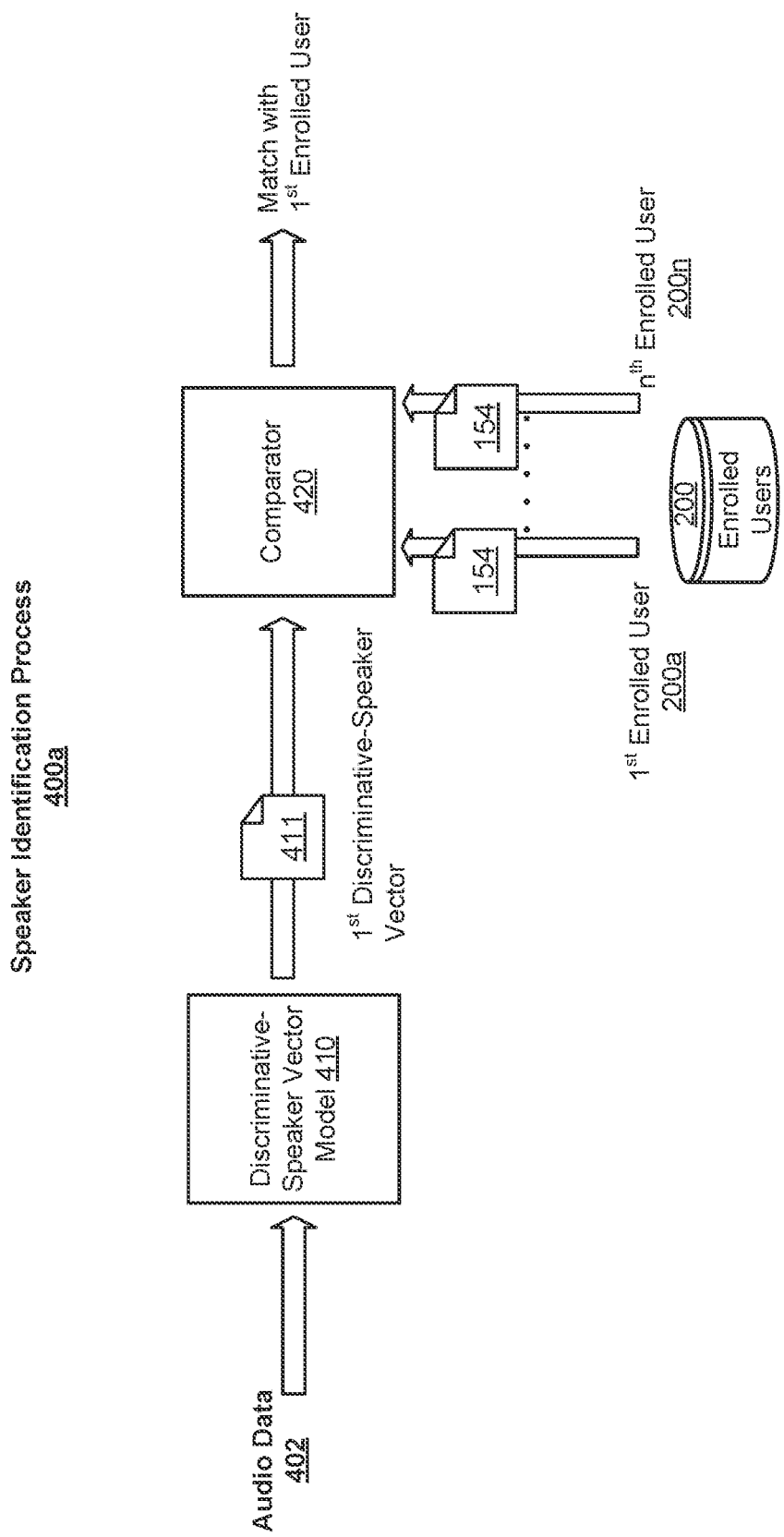
FIG. 4A is a schematic view of a speaker identification process.

Referring to FIG. 4A, in some examples, the associator 160 resolves the identity of the user 102 that spoke the utterance 106 by performing a speaker identification process 400a. The speaker identification process 400a may execute on the data processing hardware 12 of the AED 104. The process 400a may also execute on the server 120. The speaker identification process 400a identifies the user 102 that spoke the utterance 106 by first extracting, from the audio data 402 corresponding to the utterance 106 spoken by the user 102, a first speaker-discriminative vector 411 representing characteristics of the utterance 106. Here, the speaker identification process 400a may execute a speaker-discriminative model 410 configured to receive the audio data 402 as input and generate, as output, the first speaker-discriminative vector 411. The speaker-discriminative model 410 may be a neural network model trained under machine or human supervision to output speaker-discriminative vectors 411. The speaker-discriminative vector 411 output by the speaker-discriminative model 410 may include an N-dimensional vector having a value that corresponds to speech features of the utterance 106 that are associated with the user 102. In some examples, the speaker-discriminative vector 411 is a d-vector. In some examples, the first speaker-discriminative vector 411 includes a set of speaker-discriminative vectors each associated with a different user who is also authorized to speak the activated set of warm words. For instance, aside from the user 102 that spoke the utterance 106, other authorized users could include other individuals who were present when the user spoke 102 the utterance 106 issuing the long-standing operation and/or individuals that the user 102 added/specified as being authorized.

Once the first speaker-discriminative vector 411 is output from the model 410, the speaker identification process 400a determines whether the extracted speaker-discriminative vector 411 matches any of the enrolled speaker vectors 154 stored on the AED 104 (e.g., in the memory hardware 12) for enrolled users 200a-n (FIG. 2) of the AED 104, As described above with reference to FIG. 2, the speaker-discriminative model 410 may generate the enrolled speaker vectors 154 for the enrolled users 200 during a voice enrollment process. Each enrolled speaker vector 154 may be used as a reference vector corresponding to a voiceprint or unique identifier representing characteristics of the voice of the respective enrolled user 200.

In some implementations, the speaker identification process 400a uses a comparator 420 that compares the first speaker-discriminative vector 411 to the respective enrolled speaker vector 154 associated with each enrolled user 200a-n of the AED 104. Here, the comparator 420 may generate a score for each comparison indicating a likelihood that the utterance 106 corresponds to an identity of the respective enrolled user 200, and the identity is accepted when the score satisfies a threshold. When the score does not satisfy the threshold, the comparator may reject the identity. In some implementations, the comparator 420 computes a respective cosine distance between the first speaker-discriminative vector 411 and each enrolled speaker vector 154 and determines the first speaker-discriminative vector 411 matches one of the enrolled speaker vectors 154 when the respective cosine distance satisfies a cosine distance threshold.

In some examples, the first speaker-discriminative vector 411 is a text-dependent speaker-discriminative vector extracted from a portion of the audio data that includes the hotword 110 and each enrolled speaker vector 154 is also text-dependent on the same hotword 110. The use of text-dependent speaker vectors can improve accuracy in determining whether the first speaker-discriminative vector 411 matches any of the enrolled speaker vectors 154. In other examples, the first speaker-discriminative vector 411 is a text-independent speaker-discriminative vector extracted from the entire audio data that includes both the hotword 110 and the command 118 or from the portion of the audio data that includes the command 118.

When the speaker identification process 400a determines that the first speaker-discriminative vector 411 matches one of the enrolled speaker vectors 154, the process 400a identifies the user 102 that spoke the utterance 106 as the respective enrolled user 200 associated with the one of the enrolled speaker vectors 154 that matches the extracted speaker-discriminative vector 411. In the example shown, the comparator 420 determines the match based on the respective cosine distance between the first speaker-discriminative vector 411 and the enrolled speaker vector 154 associated with the first enrolled user 200a satisfying a cosine distance threshold. In some scenarios, the comparator 420 identifies the user 102 as the respective first enrolled user 200a associated with the enrolled speaker vector 154 having the shortest respective cosine distance from the first speaker-discriminative vector 411, provided this shortest respective cosine distance also satisfies the cosine distance threshold.

Conversely, when the speaker identification process 400a determines that the first speaker-discriminative vector 411 does not match any of the enrolled speaker vectors 154, the process 400a may identify the user 102 that spoke the utterance 106 as a guest user of the AED 104. Accordingly, the associator 160 may associate the activated set of one or more warm words 112 with the guest user and use the first speaker-discriminative vector 411 as a reference speaker vector representing the speech characteristics of the voice of the guest user. In some instances, the guest user could enroll with the AED 104 and the AED 104 could store the first speaker-discriminative vector 411 as a respective enrolled speaker vector 154 for the newly enrolled user.

In the example shown in FIG. 1A, the associator 160 associates the activated set of one or more warm words 112 with the first enrolled user 200a named Barb. In some examples, the AED 104 notifies the identified user 102 (e.g., Barb) associated with the activated set of one or more warm words 112 that the warm words 112 are active and that the user 102 can speak any of the warm words 112 to instruct the AED 104 to perform the respective action for controlling the long-standing operation. For instance, the digital assistant 105 may generate synthesized speech 123 for audible output from the speaker 18 of the AED 104 that states, "Barb, you may speak music playback controls without saying 'Ok computer'". In additional examples, the digital assistant 105 may provide a notification to a user device 50 (e.g., smart phone) linked back to user account of the identified user to inform the identified user 102 (e.g., Barb) which warm words 112 are currently active for controlling the long-standing operation.

Figure 3:
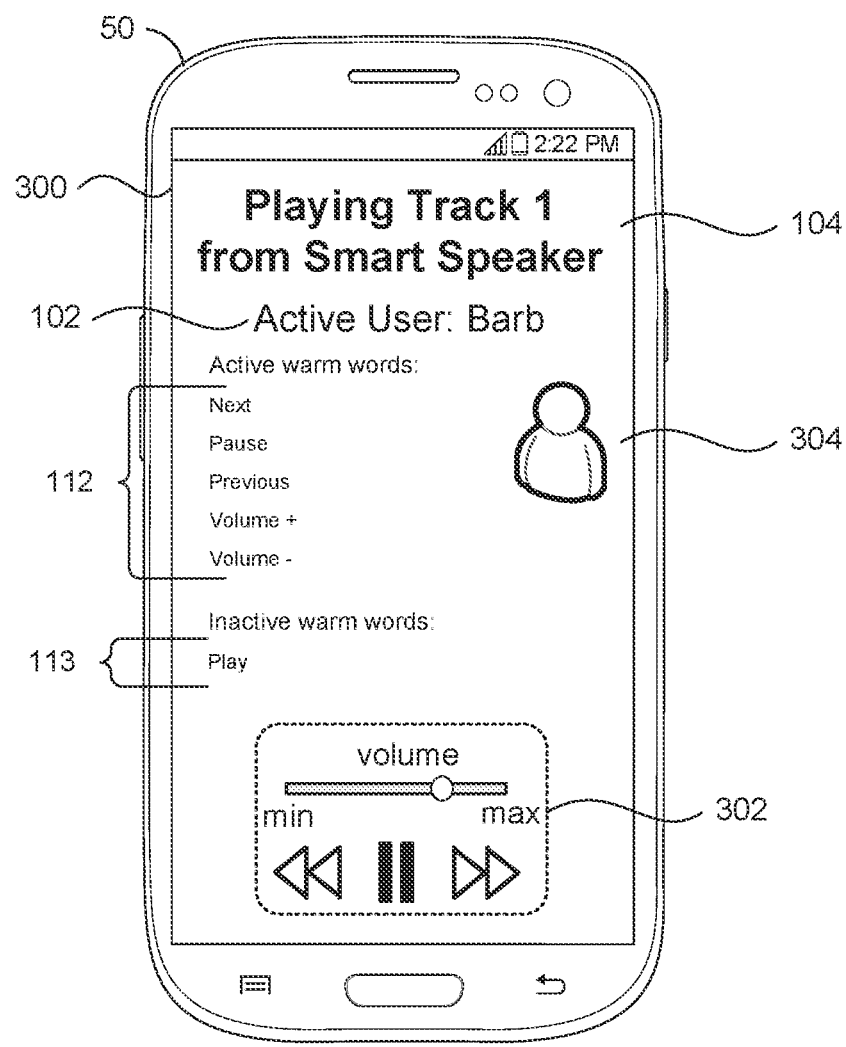
FIG. 3 is an example GUI rendered on the screen of a user device.

A graphical user interface (GUI) 300 (FIG. 3) executing on the user device 50 may display the active warm words 112 and associated respective actions for controlling the long-standing operation. Each warm word itself may serve as a descriptor identifying the respective action. FIG. 3 provides an example GUI 300 displayed on a screen of the user device 50 to inform the user 102 which warm words 112 are active for that user 102 to speak to control the long-standing operation, and which warm words 113 are inactive, and thus, unavailable for controlling the long-standing operation when spoken by the user 102. Specifically, the GUI 300 renders the active warm words 112 "next", "pause", "previous", "volume up", and "volume down," and the inactive warm word 113 "play". If the user 102 were to pause playback of the music, the warm word for "play" may become an active warm word 112 and the warm word for "pause" may become an inactive warm word 113. Each warm word 112 is associated with the respective action for controlling playback of the music 122 from the speaker 18 of the AED 104.

Additionally, the GUI 300 may render for display an identifier of the long-standing operation (e.g., "Playing Track 1"), an identifier of the AED 104 (e.g., smart speaker) that is currently performing the long-standing operation, and/or an identity of the active user 102 (e.g., Barb) that initiated the long-standing operation. In some implementations, the identity of the active user 102 includes an image 304 of the active user 102. Accordingly, by identifying the active user 102 and the active warm words 112, the GUI 300 reveals the active user 102 as a "controller" of the long-standing operation that may speak any of the active warm words 112 displayed in GUI 300 to perform a respective action for controlling the long-standing operation. As mentioned above, the active set of warm words 112 are dependent on the speaking voice of Barb 102, since Barb 102 seeded the initial command 118 "play music," to initiate the long-standing operation. By depending the active set of warm words 112 on the speaking voice of Barb 102, the AED 104 (e.g., via the digital assistant 105) will only perform a respective action associated with one of the active warm words 112 when the active warm word 112 is spoken by Barb 102, and will suppress performance (or at least require approval from Barb 102) of the respective action when the active warm word 112 is spoken by a different speaker.

The user device 50 may also render graphical elements 302 for display in the GUI 300 for performing the respective actions associated with the respective active warm words 112 to playback of the music 122 from the speaker 18 of the AED 104. In the example shown, the graphical elements 302 are associated with playback controls for the long-standing operation of playing music 122, that when selected, cause the device 50 to perform a respective action. For instance, the graphical elements 302 may include playback controls for performing the action associated with the warm word 112 "next," performing the action associated with the warm word 112 "pause," performing the action associated with the warm word 112 "previous," performing the action associated with warm word 112 "volume up," and performing the action associated with the warm word 112 "volume down." The GUI 300 may receive user input indications via any one of touch, speech, gesture, gaze, and/or an input device (e.g., mouse or stylist) to control the playback of the music 122 from the speaker 18 of the AED 104. For example the user 102 may provide a user input indication indicating selection of the "next" control (e.g., by touching the graphical button in the GUI 300 that universally represents "next") to cause the AED 104 to perform the action of advancing to the next song in the playlist associated with the music 122.

Referring back to FIGS. 1A and 1B, activating the set of warm words 112 by the warm word selector 126 causes the AED 104 to activate, for each corresponding warm word 112 in the activated set of one or more warm words 112, a respective warm word model 114 to run the AED 104. Here, the warm word models 114 may be stored on the memory hardware 12 of the AED 104 or on the server 120. If stored on the server, the AED 104 may request the server 120 to retrieve a warm word model 114 for a corresponding warm word 112 and provide the retrieved warm word model 114 so that the AED 104 can activate the warm word model 114. As will be described in greater detail below, an active warm word model 114 running on the AED 104 may detect an utterance 146 of the corresponding active warm word 112 in streaming audio captured by the AED 104 without performing speech recognition on the captured audio. Further, a single warm word model 114 may be capable of detecting all of the active warm words 112 in streaming audio. Thus, a warm word model 114 may detect a set of active warm words, and a different warm word model 114 may detect a different set of active warm words.

In additional implementations, activating the set of warm words 112 by the warm word selector 126 causes the AED 104 to execute the speech recognizer 116 on the AED 104 in a low-power and low-fidelity state. Here, the speech recognizer 116 is constrained or biased to only recognize the one or more warm words 112 that are active when spoken in the utterance captured by the AED 104. Since the speech recognizer 116 is only recognizing a limited number of terms/phrases, the number of parameters of the speech recognizer 116 may be drastically reduced, thereby reducing the memory requirements and number of computations needed for recognizing the active warm words in speech. Accordingly, the low-power and low-fidelity characteristics of the speech recognizer 116 may be suitable for execution on a digital signal processor (DST). In these implementations, the speech recognizer 116 executing on the AED 104 may recognize an utterance 146 of an active warm word 112 in streaming audio captured by the AED 104 in lieu of using a warm word model 114.

Referring to FIG. 1B, while the digital assistant 105 is performing the long-standing operation of playing music 122, the user 102 speaks an utterance 146 that includes one of the warm words 112 from the activated set of one or more warm words 112. In the example shown, the user 102 utters the active warm word 112 "next". Without performing speech recognition on the captured audio, the AED 104 may apply the warm word models 114 activated for the activated set of one or more warm words 112 to identify whether the utterance 146 includes any active warm words 112. The active warm words 112 may be "next", "pause", "previous", "volume up", and "volume down". The AED 104 compares the audio data that corresponds to the utterance 146 to the activated warm word models 114 that correspond to the active warm words 112 "next," "pause," "previous," "volume up," and "volume down" and determines that the warm word model 114 activated for the warm word 112 "next" detects the warm word 112 "next" in the utterance 146 without performing speech recognition on the audio data. Based on identifying the warm word 112 "next" that corresponds to the instruction to advance to the next song, the AED 104 performs a speaker verification process 400b on the audio data corresponding to the utterance 146 to determine whether the utterance 146 was spoken by the same user 102 that is associated with the activated set of one or more warm words 112. If the speaker verification process 400b on the audio data corresponding to the utterance 146 indicates that the utterance 146 was spoken by the same user 102 that is associated with the activated set of one or more warm words 112, the AED 104 may proceed with performing the respective action associated with the identified warm word 112 for controlling the long-standing operation. Conversely, if the speaker verification process 400b on the audio data corresponding to the utterance 146 indicates that the utterance 146 was not spoken by the same user 102 that is associated with the activated set of one or more warm words 112, the AED 104 may suppress performance (or at least require approval from the particular user 102 (e.g., in FIG. 1C)) of the respective action when the warm word 112 is spoken by the different speaker.

In some implementations, the AED 104 identifies warm words 112 that are not among the activated set of one or more warm words 112 but whose models are still stored in the warm word models 114. In this instance, the AED 104 may provide an indication to the user device 50 to display in the GUI 300 that the warm word is not among (e.g., inactive) the activated set of the one or more warm words 112. For example, the user 102 may speak "play" when the music 122 is playing. The AED 104 may identify the warm word 112 "play." Because the warm word 112 "play" is not among the activated set of one or more warm words 112, the AED 104 performs no action. However, the user device 50 may display in GUI 300 an indication that the warm word "play" is an inactive warm word 113 and indicate that the active warm words 112 are "next," "pause," "previous," "volume up," and "volume down."

The warm word models 114 may detect that the associated utterance 146 includes one of the warm words 112 from the activated set of one or more warm words 112 by extracting audio features of the audio data associated with the utterance 146. The activated warm word models 114 may each generate a corresponding warm word confidence score by processing the extracted audio features and comparing the corresponding warm word confidence score to a warm word confidence threshold. For instance, the warm word models 114 may collectively generate corresponding warm word confidence scores for each of the active warm words 112 "play", "next", "pause", "previous", volume up", and "volume down". In some implementations, the speech recognizer 116 generates a warm word confidence score for each portion of processed audio data associated with the utterance 146. If the warm word confidence score satisfies a threshold, then the warm word model 114 determines that the audio data corresponding to the utterance 146 includes a warm word 112 among the activated set of the one or more warm words 112. For example, if the warm word confidence score generated by a warm word model 114 (or the speech recognizer 116) is 0.9 and the warm word confidence threshold is 0.8, then the AED 104 determines that the audio data corresponding with the utterance 146 includes a warm word 112.

In some implementations, if the warm word confidence score is within a range below the threshold, the digital assistant 105 may generate synthesized speech 123 for audible output from the speaker 18 of the AED 104 that requests that the user 102 confirm or repeat the warm word 112. In these implementations, if the user 102 confirms that the user 102 spoke the warm word 112, the AED may use the audio data to update the corresponding warm word model 114.

Figure 4B:
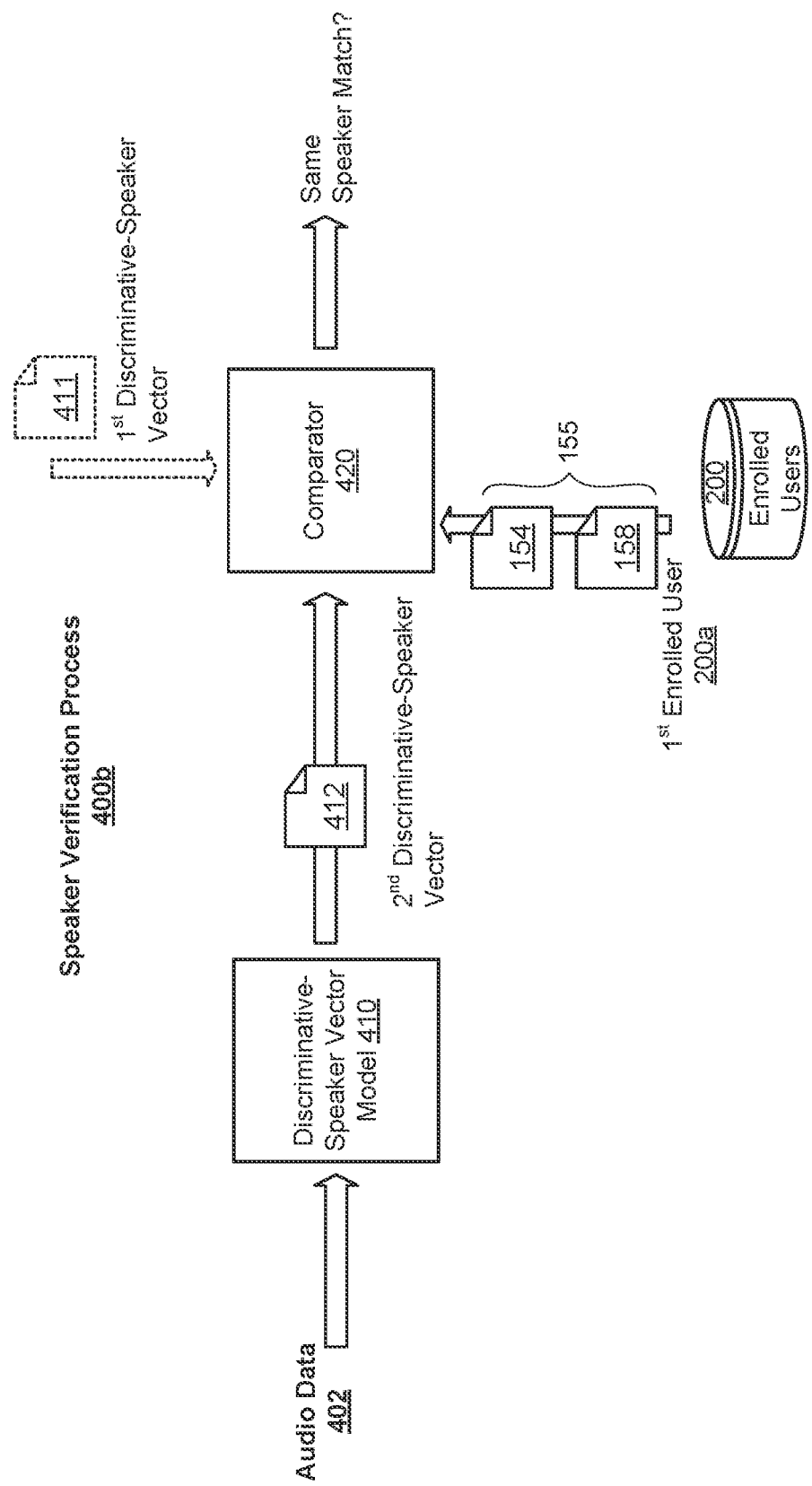
FIG. 4B is schematic views of a speaker verification process.

Referring to FIG. 4B, in response to identifying that the additional audio data 402 corresponding to the additional utterance 146 includes one of the warm words 112 from the activated set of warm words 112, the associator 160 resolves the identity of the user 102 that spoke the utterance 146 by performing the speaker verification process 400b. The speaker verification process 400b may execute on the data processing hardware 12 of the AED 104. The process 400b may also execute on the server 120 instead of or in combination with executing on the AED 104. The speaker verification process 400b identifies the user 102 that spoke the utterance 146 by first extracting, from the audio data 402 corresponding to the utterance 146 spoken by the user 102, a second speaker-discriminative vector 412 representing characteristics of the utterance 146. Here, the speaker verification process 400b may execute the speaker-discriminative model 410 configured to receive the audio data 402 as input and generate, as output, the second speaker-discriminative vector 412. As discussed above in FIG. 4A, the speaker-discriminative model 410 may be a neural network model trained under machine or human supervision to output speaker-discriminative vectors 412. The second speaker-discriminative vector 412 output by the speaker-discriminative model 410 may include an N-dimensional vector having a value that corresponds to speech features of the utterance 146 that are associated with the user 102. In some examples, the speaker-discriminative vector 412 is a d-vector.

Once the second speaker-discriminative vector 412 is output from the speaker-discriminator model 410, the speaker verification process 400b determines whether the extracted speaker-discriminative vector 412 matches a reference speaker vector 155 associated with the first enrolled user 200a stored on the AED 104 (e.g., in the memory hardware 12). The reference speaker vector 155 associated with the first enrolled user 200a may include the respective enrolled speaker vector 154 associated with the first enrolled user 200a. In other examples, the reference speaker vector 155 includes a text-dependent speaker vector 158 extracted from one or more audio samples of the respective enrolled user 200a speaking the active warm word 112 that was identified in the additional audio data 402 corresponding to the utterance 146.

As described above with reference to FIG. 2, the speaker-discriminative model 410 may generate the enrolled speaker vectors 154 for the enrolled users 200 during a voice enrollment process. Each enrolled speaker vector 154 may be used as a reference vector corresponding to a voiceprint or unique identifier representing characteristics of the voice of the respective enrolled user 200. Additionally, during enrollment, the enrolled user 200a may train text-dependent speaker vectors 158 for each of one or more warm words 112 that, when active, may be spoken to cause the AED 104 to perform a respective action for controlling a long-standing operation or perform some other command. For example, the text-dependent speaker vector 158 for enrolled user 200a represents speech characteristics of the enrolled user 200a speaking the respective warm words 112 of "play," "pause," "next," "previous," "volume up," and "volume down."

In some implementations, the speaker verification process 400b uses a comparator 420 that compares the second speaker-discriminative vector 412 to the reference speaker vector 155 associated with the first enrolled user 200a of the enrolled users 200. Here, the comparator 420 may generate a score for the comparison indicating a likelihood that the utterance 146 corresponds to the identity of the first enrolled user 200a, and the identity is accepted when the score satisfies a threshold. When the score does not satisfy the threshold, the comparator 420 may reject the identity. In some implementations, the comparator 420 computes a respective cosine distance between the second speaker-discriminative vector 412 and the reference speaker vector 155 associated with the first enrolled user 200a and determines the second speaker-discriminative vector matches the reference speaker vector 155 when the respective cosine distance satisfies a cosine distance threshold.

When the speaker verification process 400b determines that the second speaker-discriminative vector 412 matches the reference speaker vector 155 associated with the first enrolled user 200a, the process 400b identifies the user 102 that spoke the utterance 146 as the first enrolled user 200a associated with the reference speaker vector 155. In the example shown, the comparator 420 determines the match based on the respective cosine distance between the second speaker-discriminative vector 412 and the reference speaker vector 155 associated with the first enrolled user 200a satisfying a cosine distance threshold. In some scenarios, the comparator 420 identifies the user 102 as the respective first enrolled user 200a associated with the reference speaker vector 155 having the shortest respective cosine distance from the second speaker-discriminative vector 412, provided this shortest respective cosine distance also satisfies the cosine distance threshold.

With reference to FIG. 4A above, in some implementations, the speaker identification process 400a determines that the first speaker-discriminative vector 411 does not match any of the enrolled speaker vectors 154, and identifies the user 102 that spoke the utterance 106 as a guest user of the AED 104 and associates the activated set of one or more warm words 112 with the user 102. Accordingly, the speaker verification process 400b may first determine whether the user 102 that spoke the utterance 106 was identified by the speaker identification process 400a as an enrolled user 200 or a guest user. When the user 102 is a guest user, the comparator 420 compares the second speaker-discriminative vector 412 to the first speaker-discriminative vector 411 obtained during the speaker identification process 400a. Here, the first speaker-discriminative vector 411 represents the characteristics of the utterance 106 spoken by the guest user 102, and thus, is used as a reference vector to verify whether or not the utterance 146 was spoken by the guest user 102 or another user. Here, the comparator 420 may generate a score for the comparison indicating a likelihood that the utterance 146 corresponds to the identity of the guest user 102, and the identity is accepted when the score satisfies a threshold. When the score does not satisfy the threshold, the comparator 420 may reject the identity of the guest user that spoke the utterance 146. In some implementations, the comparator 420 computes a respective cosine distance between the first speaker-discriminative vector 411 and the second speaker-discriminative vector 412 and determines the first speaker-discriminative vector 411 matches the second speaker-discriminative vector 412 when the respective cosine distance satisfies a cosine distance threshold.

Referring back to FIG. 1B, the AED 104 (e.g., via the digital assistant 105) will only proceed to perform the respective action of advancing to the next song/track associated with the active warm word 112 "next" when the speaker verification process 400b verifies the speaker of the utterance 146. In other words, after the word 112 "next" is detected in the additional audio 402 corresponding to the additional utterance 146, the AED must verify that the additional utterance 146 was spoken by the same user 102 that is associated with the activated set of one or more warm words before performing the respective action associated with the detected warm word 112 "next" of advancing to the next song in the playlist associated with the music 122. If the speaker verification process 400b is unable to verify that the additional utterance 146 was spoken by the same speaker that spoke the utterance 106, the AED will suppress performance (or at least require approval from the user 102) of the respective action when the warm word 112 "next" is spoken by a different speaker.

Figure 1C:
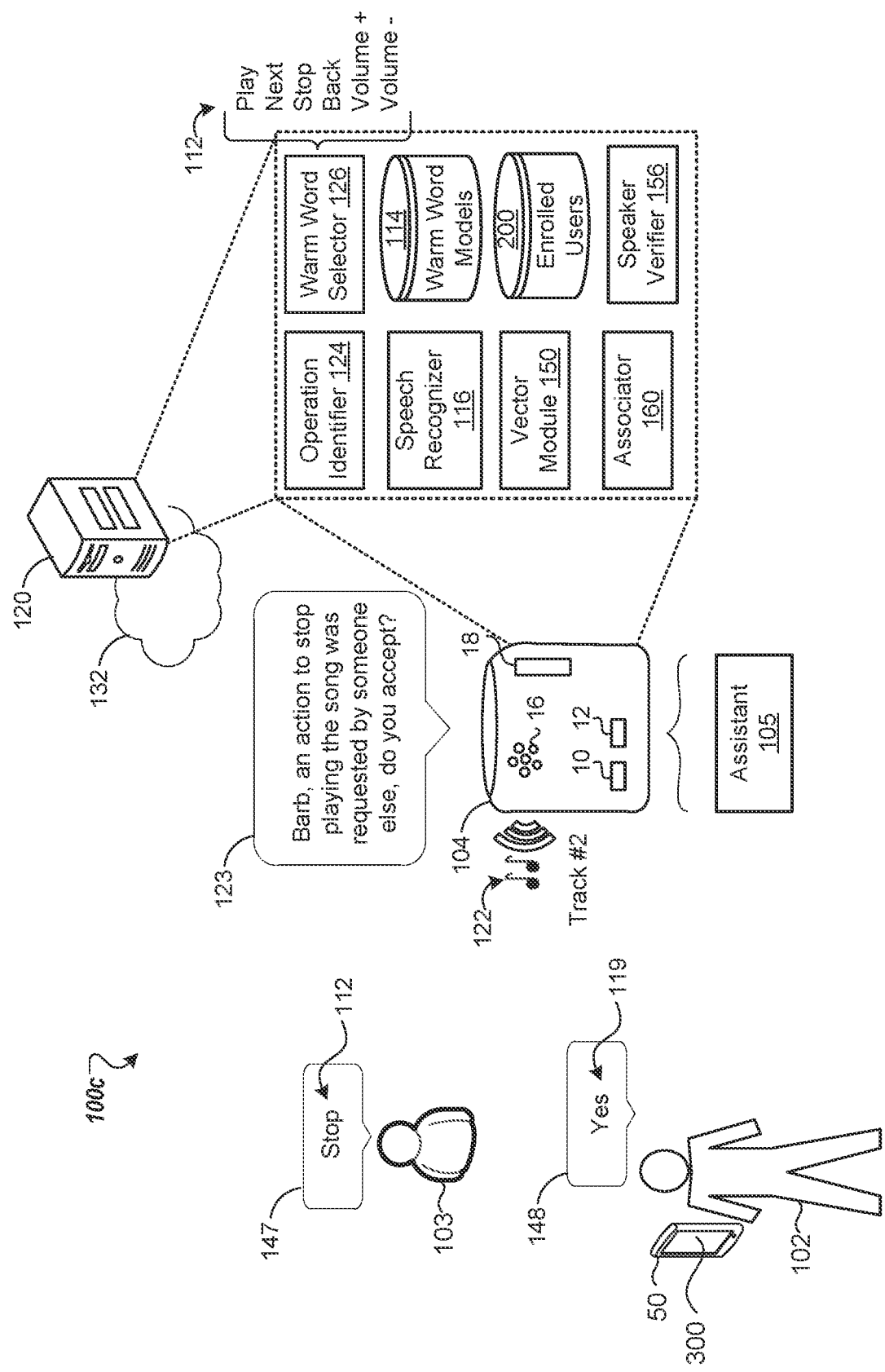

Referring now to FIG. 1C, another example system 100c shows another user 103 speaking an utterance 147 that includes the active warm word 112 "stop" from the activated set of one or more warm words 112 while the digital assistant 105 is performing the long-standing operation of playing music 122. Without performing speech recognition on audio data that corresponds to the utterance 147, the AED 104 may compare the audio data to the warm word models 114 activated for the activated set of one or more warm words 112 to identify whether the utterance 147 includes any active warm words 112. The active warm words 112 may include "play", "next", "stop", "back", "volume up", and "volume down". In the example shown, the AED 104 determines that the warm word model 114 activated for the warm word 112 "stop" detects the warm word 112 "stop" in the utterance 147 without performing speech recognition on the audio data 402. Based on identifying the warm word 112 "stop", the AED 104 performs the speaker verification process 400b on the audio data corresponding to the utterance 147 to determine whether the utterance 147 was spoken by the same user 102 (e.g., Barb) that is associated with the activated set of one or more warm words 112.

In the example shown, performing speaker verification process 400b on the audio data 402 corresponding to the utterance 147 indicates that the utterance 147 was not spoken by Barb 102. For example, the discriminative-speaker vector model 410 of the speaker verification process 400b of FIG. 4B may generate a second speaker-discriminative vector 412 representing characteristics of the utterance 147 and the comparator 420 may determine that the second speaker-discriminative vector 412 does not match the reference speaker vector 155 associated with the first enrolled user 200a (e.g., Barb). Accordingly, the speaker verification process 400b determines that the utterance 147 was spoken by a different user 103 than the user 102 (e.g., Barb) that is associated with the activated set of one or more warm words 112. In some implementations, the AED 104 suppresses performance of the respective action associated with the identified warm word 112 "stop" for controlling the long-standing operation of playing music 122 when the utterance 147 was spoken by the different user 103. In other implementations, in response to the verification process 400b determining that the utterance 147 was spoken by someone other than Barb 102, the AED 104 requests approval from Barb 102 to perform the respective action associated with the identified warm word 112 "stop". In one example, the digital assistant 105 requests approval from Barb 102 by generating synthesized speech 123 for audible output from the speaker 18 of the AED 104 that prompts Barb 102 to authorize or reject the performance of the respective action associated with the warm word 112 "stop". For instance, the digital assistant 105 may generate synthesized speech 123 for audible output from the speaker 18 of the AED 104 that asks, "Barb, an action to stop playing the song was requested by someone else, do you accept?" In response, Barb 112 speaks an utterance 148 that includes an acknowledgement 119. The acknowledgement 119 by the user 102 may be "yes" to authorize performance of the respective action, or "no" to reject performance of the respective action.

In the example shown, Barb 102 utters the acknowledgement 119 "yes" that corresponds to authorizing the performance of the respective action associated with the warm word 112 "stop". In some implementations, the AED 104 also performs the speaker verification process 400b on audio data corresponding to the utterance 148 to verify that the acknowledgement 119 was spoken by the authorized user 102 (e.g., Barb) that is associated with the activated set of one or more warm words 112. Based on receiving the acknowledgement 119 "yes" from Barb 102 authorizing performance of the respective action "stop" and the speaker verification process 400b performed on the audio data corresponding to the utterance 148 indicating that the utterance 148 was spoken by Barb 102, the AED 104 may proceed with performing the respective action associated with the identified warm word "stop" 112 spoken by the different user 103 for controlling the long-standing operation. Conversely, when the speaker verification process 400b performed on the audio data corresponding to the utterance 148 indicates that the utterance 148 was not spoken by Barb 102 or when the acknowledgement 119 spoken by Barb 102 was instead "no", the MED 104 may suppress performance of the respective action "stop" so that the music playing 122 from the AED 104 continues without stopping.

Additionally or alternatively, the digital assistant 105 may provide a notification to the user device 50 linked to the user account of Barb 102 that prompts Barb 102 to authorize or reject the performance of the respective action associated with the warm word 112 "stop". For instance, the GUI 300 displayed on the user device 50 may render the prompt as a notification to allow Barb 102 to authorize or reject the performance of the respective action associated with the warm word 112 "stop". In one example, the GUI 300 renders graphical elements/buttons that Barb 102 may select to authorize or reject the performance of the respective action. For instance, Barb 102 may provide a user input indication indicating selection of a graphical element/button for the acknowledgement 119 "yes" (e.g., by touching the graphical element for "yes" in the GUI 300) that corresponds to authorizing the performance of the respective action associated with the warm word 112 "stop". In response to receiving the user input indication indicating selection of the graphical element/button for the acknowledgement 119 "yes" by Barb 102, the AED 104 may proceed with performing the respective action associated with the identified warm word "stop" 112 spoken by the different user 103 for controlling the long-standing operation. Conversely, Barb 102 may provide a user input indication indicating selection of a graphical element/button for the acknowledgement 119 "no" (e.g., by touching the graphical element for "no" in the GUI 300) to reject the performance of the respective action associated with the warm word 112 "stop", and thereby cause the AED 104 to suppress performance of the respective action.

In some implementations, identifying which user 102, 103 spoke the utterance 147 may help Barb 102 determine whether to authorize or reject the action (e.g., when one or more users 102 is present in a room with Barb 102). Continuing with the example shown in FIG. 1C, prompting Barb 102 to authorize or reject the performance of the respective action associated with the warm word 112 "stop" further includes identifying the different user 103 that spoke the utterance 147. Here, when the AED 104 performs the speaker verification process 400b on the audio data 402 corresponding to the utterance 147, the speaker verification process 400b may identify the user 103 as the second enrolled user 200b (e.g., Ed), For instance, the process 400b may determine that the speaker-discriminative vector 412 representing characteristics of the utterance 147 spoken by the user 103 match a respective enrolled speaker vector 154 stored on the AED 104 for the second enrolled user 200b. Accordingly, when the user 103 is identified as one of the enrolled users 200, the digital assistant 105 may similarly generate synthesized speech 123 for audible output from the speaker 18 of the AED 104 that prompts the user 102, "Barb, do you authorize Ed's request to stop the music? Is Ed authorized for controlling music playback settings?" In response, Barb 102 speaks the utterance 148 that includes the acknowledgement 119 "yes". In some implementations, Barb 102 authorizes Ed's 103 request to stop playing music 122 but rejects future control of the long-standing operation by Ed 103. Barb 102 may also have the ability to authorize Ed 102 to control the long-standing operation for a predetermined period of time (e.g., one hour, one day, etc.).

FIG. 5 is a flowchart of an example arrangement of operations for a method 500 for activating a set of one or more warm words 112 associated with a long-standing operation. At operation 510, the method 500 includes receiving, at data processing hardware 10, audio data 402 corresponding to an utterance 106 spoken by a user 102 and captured by an assistant-enabled device (AED) 104 associated with the user 102. The utterance 106 includes a command for a digital assistant 105 to perform a long-standing operation. The long-standing operation may include setting a timer for a specified amount of time or playing music from a streaming service. The AED 104 may identify the user 102 that spoke the utterance 106 by performing a speaker identification process 400a.

At operation 520, the method 500 includes, after receiving the audio data 402 corresponding to the utterance 106, activating, by the data processing hardware 10, a set of one or more warm words 112 and associating, by the data processing hardware 10, the activated set of one or more warm words 112 with only the user 102 that spoke the utterance 106. Each warm word 112 in the set of one or more warm words 112 is associated with a respective action for controlling the long-standing operation. For example, the respective actions for the long-standing operation of playing music 122 as playback audio from the speaker 18 of the AED 104 may include one or more of reverting to a previous song in the playlist, playing the music playlist, pausing the music playlist, skipping to a next song in the playlist, and adjusting a volume level of the speaker 18.

At operation 530, the method 500 also includes, while the digital assistant 105 is performing the long-standing operation, receiving, at the data processing hardware 10, additional audio data 402 corresponding to an additional utterance 146 captured by the AED 104. The AED 104 identifies, by the data processing hardware 10, in the additional audio data 402, one of the warm words 112 from the activated set of one or more warm words 112. The AED 104 may identify that one of the warm words 112 from the activated set of one or more warm words 112 is in the additional audio data 402 without performing speech recognition on the captured audio. For example, the AED 104 may compare the audio data 402 that corresponds to the utterance 106 to activated warm word models 114 that correspond to the activated set of one or more warm words 112.

At operation 540, the method 500 further includes performing, by the data processing hardware 10, speaker verification 400b on the additional audio data 402 to determine whether the additional utterance 146 was spoken by the same user 102 that is associated with the activated set of one or more warm words 112. When the additional utterance 146 was spoken by the same user 102 that is associated with the activated set of one or more warm words 112, the method 500 includes performing, by data processing hardware 10, the respective action associated with the identified one of the warm words 112 for controlling the long-standing operation. When the speaker verification 400 indicates that the additional utterance 146 was not spoken by the same user 102 that is associated with the activated set of one or more warm words 112, the AED 104 may suppress performance of the respective action.

Figure 6:
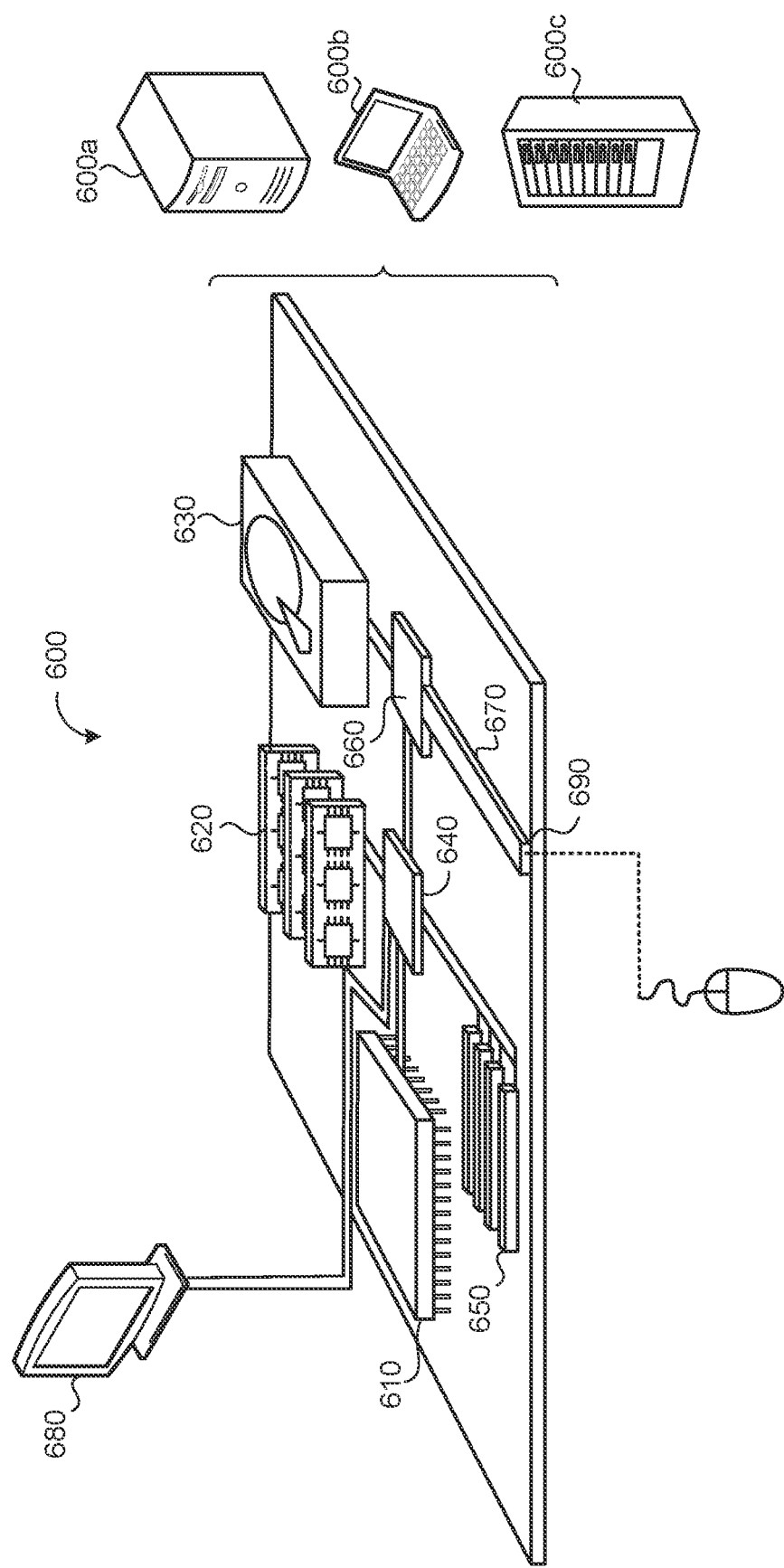
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable 110, programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for activating speaker-dependent warm words, the method comprising:
 receiving, at data processing hardware, audio data corresponding to an utterance spoken by a user and captured by an assistant-enabled device associated with the user, the utterance comprising a command for a digital assistant to perform a long-standing operation;
 after receiving the audio data corresponding to the utterance:
  activating, by the data processing hardware, a set of one or more warm words each associated with a respective action for controlling the long-standing operation; and associating, by data processing hardware, the activated set of one or more warm words with only the user that spoke the utterance, such that other users are not permitted to use the activated set of one or more warm words to control the long-standing operation; and while the digital assistant is performing the long-standing operation:
receiving, at the data processing hardware, additional audio data corresponding to an additional utterance captured by the assistant-enabled device;
identifying, by the data processing hardware, in the additional audio data, one of the warm words from the activated set of one or more warm words;
performing, by the data processing hardware, speaker verification on the additional audio data to determine whether the additional utterance was spoken by the same user that is associated with the activated set of one or more warm words;
when the additional utterance was spoken by the same user that is associated with the activated set of one or more warm words, performing, by data processing hardware, the respective action associated with the identified one of the warm words for controlling the long-standing operation; and
when the additional utterance was spoken by a different user than the same user that is associated with the activated set of one or more warm words:
prompting, by the data processing hardware, the same user that is associated with the activated set of one or more warm words to authorize performance of the respective action associated with the identified one of the warm words for controlling the long-standing operation;
receiving, at the data processing hardware, an acknowledgement from the same user authorizing performance of the respective action; and
performing, by the data processing hardware, the respective action associated with the identified one of the warm words for controlling the long-standing operation.

2. The method of claim 1, wherein:
activating the set of one or more warm words comprises activating, for each corresponding warm word in the activated set of one or more warm words, a respective warm word model to run on the assistant-enabled device associated with the same user that is associated with the activated set of one or more warm words; and
identifying, in the additional audio data, the one of the warm words from the activated set of one or more warm words comprises detecting, using the respective warm word model activated for the corresponding one of the warm words, the one of the warm words in the additional audio data without performing speech recognition on the additional audio data.

3. The method of claim 2, wherein detecting the one of the warm words in the additional audio data comprises:
extracting audio features of the additional audio data;
generating, using the respective warm word model activated for the corresponding one of the warm words, a warm word confidence score by processing the extracted audio features; and
determining that the additional audio data corresponding to the additional utterance includes the corresponding one of the warm words when the warm word confidence score satisfies a warm word confidence threshold.

4. The method of claim 1, wherein:
activating the set of one or more warm words comprises executing a speech recognizer on the assistant-enabled device, the speech recognizer biased to recognize the one or more warm words in the activated set of one or more warm words; and
identifying, in the additional audio data, the one of the warm words from the activated set of one or more warm words comprises recognizing, using the speech recognizer executing on the assistant-enabled device, the one of the warm words in the additional audio data.

5. The method of claim 1, further comprising, after receiving the audio data corresponding to the utterance spoken by the user, performing, by the data processing hardware, speaker identification on the audio data to identify the user that spoke the utterance by:
extracting, from the audio data corresponding to the utterance spoken by the user, a first speaker-discriminative vector representing characteristics of the utterance spoken by the user;
determining whether the extracted first speaker-discriminative vector matches any enrolled speaker vectors stored on the assistant-enabled device, each enrolled speaker vector associated with a different respective enrolled user of the assistant-enabled device; and
when the extracted first speaker-discriminative vector matches one of the enrolled speaker vectors, identifying the user that spoke the utterance as the respective enrolled user associated with the one of the enrolled speaker vectors that matches the extracted first speaker-discriminative vector.

6. The method of claim 5, wherein:
the utterance spoken by the user further comprises a hotword preceding the command for the digital assistant to perform the long-standing operation;
the extracted first speaker-discriminative vector comprises a text-dependent speaker-discriminative vector extracted from the portion of the audio data that includes the hotword; and
each enrolled speaker vector comprises a text-dependent enrolled speaker vector extracted from one or more audio samples of the respective enrolled user speaking the hotword.

7. The method of claim 5, wherein performing the speaker verification on the additional audio data comprises:
extracting, from the additional audio data corresponding to the additional utterance of the one of the warm words, a second speaker-discriminative vector representing characteristics of the additional utterance;
determining whether the extracted second speaker-discriminative vector matches a reference speaker vector for the respective enrolled user identified as the user that spoke the utterance; and
when the extracted second speaker-discriminative vector matches the reference speaker vector, determining that the additional utterance was spoken by the same user that is associated with the activated set of one or more warm words.

8. The method of claim 7, wherein the reference speaker vector comprises the enrolled speaker vector associated with the respective enrolled user.

9. The method of claim 7, wherein the reference speaker vector comprises a text-dependent speaker vector extracted from one or more audio samples of the respective enrolled user speaking the identified one of the warm words.

10. The method of claim 5, wherein:
when the extracted first speaker-discriminative vector does not match any of the enrolled speaker vectors, identifying the user that spoke the utterance as a guest user of the assistant-enabled device; and
performing the speaker verification on the additional audio data comprises:
   extracting, from the additional audio data, a second speaker-discriminative vector representing characteristics of the additional utterance;
   determining whether the extracted second speaker-discriminative vector matches the extracted first speaker-discriminative vector representing the characteristics; and
   when the extracted first and second speaker-discriminative vectors match, determining that the additional utterance was spoken by the same user that is associated with the activated set of one or more warm words.

11. The method of claim 1, further comprising, when the additional utterance was spoken by a different user than the same user that is associated with the activated set of one or more warm words, suppressing, by the data processing hardware, performance of the respective action associated with the identified one of the warm words for controlling the long-standing operation.

12. The method of claim 1, wherein prompting the same user that is associated with the activated set of one or more warm words comprises identifying the different user that spoke the additional utterance.

13. The method of claim 1, further comprising:
determining, by the data processing hardware, when the digital assistant stops performing the long-standing operation; and
deactivating, by the data processing hardware, the set of one or more warm words.

14. A system comprising:
data processing hardware; and
memory hardware in communication with the data processing hardware, the memory hardware storing instructions that when executed on the data processing hardware cause the data processing hardware to perform operations comprising:
   receiving audio data corresponding to an utterance spoken by a user and captured by an assistant-enabled device associated with the user, the utterance comprising a command for a digital assistant to perform a long-standing operation;
   after receiving the audio data corresponding to the utterance:
      activating a set of one or more warm words each associated with a respective action for controlling the long-standing operation; and
      associating the activated set of one or more warm words with only the user that spoke the utterance, such that other users are not permitted to use the activated set of one or more warm words to control the long-standing operation; and
   while the digital assistant is performing the long-standing operation:
      receiving additional audio data corresponding to an additional utterance captured by the assistant-enabled device;
      identifying in the additional audio data, one of the warm words from the activated set of one or more warm words;
      performing speaker verification on the additional audio data to determine whether the additional utterance was spoken by the same user that is associated with the activated set of one or more warm words;
      when the additional utterance was spoken by the same user that is associated with the activated set of one or more warm words, performing the respective action associated with the identified one of the warm words for controlling the long-standing operation; and
      when the additional utterance was spoken by a different user than the same user that is associated with the activated set of one or more warm words:
         prompting the same user that is associated with the activated set of one or more warm words to authorize performance of the respective action associated with the identified one of the warm words for controlling the long-standing operation;
         receiving an acknowledgement from the same user authorizing performance of the respective action; and
         performing the respective action associated with the identified one of the warm words for controlling the long-standing operation.

15. The system of claim 14, wherein:
activating the set of one or more warm words comprises activating, for each corresponding warm word in the activated set of one or more warm words, a respective warm word model to run on the assistant-enabled device associated with the same user that is associated with the activated set of one or more warm words; and
identifying, in the additional audio data, the one of the warm words from the activated set of one or more warm words comprises detecting, using the respective warm word model activated for the corresponding one of the warm words, the one of the warm words in the additional audio data without performing speech recognition on the additional audio data.

16. The system of claim 15, wherein detecting the one of the warm words in the additional audio data comprises:
extracting audio features of the additional audio data;
generating, using the respective warm word model activated for the corresponding one of the warm words, a warm word confidence score by processing the extracted audio features; and
determining that the additional audio data corresponding to the additional utterance includes the corresponding one of the warm words when the warm word confidence score satisfies a warm word confidence threshold.

17. The system of claim 14, wherein:
activating the set of one or more warm words comprises executing a speech recognizer on the assistant-enabled device, the speech recognizer biased to recognize the one or more warm words in the activated set of one or more warm words; and
identifying, in the additional audio data, the one of the warm words from the activated set of one or more warm words comprises recognizing, using the speech recognizer executing on the assistant-enabled device, the one of the warm words in the additional audio data.

18. The system of claim 14, wherein the operations further comprise, after receiving the audio data corresponding to the utterance spoken by the user, performing speaker identification on the audio data to identify the user that spoke the utterance by:
  extracting, from the audio data corresponding to the utterance spoken by the user, a first speaker-discriminative vector representing characteristics of the utterance spoken by the user;
  determining whether the extracted first speaker-discriminative vector matches any enrolled speaker vectors stored on the assistant-enabled device, each enrolled speaker vector associated with a different respective enrolled user of the assistant-enabled device; and
  when the extracted first speaker-discriminative vector matches one of the enrolled speaker vectors, identifying the user that spoke the utterance as the respective enrolled user associated with the one of the enrolled speaker vectors that matches the extracted first speaker-discriminative vector.

19. The system of claim 18, wherein:
  the utterance spoken by the user further comprises a hotword preceding the command for the digital assistant to perform the long-standing operation;
  the extracted first speaker-discriminative vector comprises a text-dependent speaker-discriminative vector extracted from the portion of the audio data that includes the hotword; and
  each enrolled speaker vector comprises a text-dependent enrolled speaker vector extracted from one or more audio samples of the respective enrolled user speaking the hotword.

20. The system of claim 18, wherein performing the speaker verification on the additional audio data comprises:
  extracting, from the additional audio data corresponding to the additional utterance of the one of the warm words, a second speaker-discriminative vector representing characteristics of the additional utterance;
  determining whether the extracted second speaker-discriminative vector matches a reference speaker vector for the respective enrolled user identified as the user that spoke the utterance; and
  when the extracted second speaker-discriminative vector matches the reference speaker vector, determining that the additional utterance was spoken by the same user that is associated with the activated set of one or more warm words.

21. The system of claim 20, wherein the reference speaker vector comprises the enrolled speaker vector associated with the respective enrolled user.

22. The system of claim 20, wherein the reference speaker vector comprises a text-dependent speaker vector extracted from one or more audio samples of the respective enrolled user speaking the identified one of the warm words.

23. The system of claim 18, wherein:
  when the extracted first speaker-discriminative vector does not match any of the enrolled speaker vectors, identifying the user that spoke the utterance as a guest user of the assistant-enabled device; and
  performing the speaker verification on the additional audio data comprises:
    extracting, from the additional audio data, a second speaker-discriminative vector representing characteristics of the additional utterance;
    determining whether the extracted second speaker-discriminative vector matches the extracted first speaker-discriminative vector representing the characteristics; and
    when the extracted first and second speaker-discriminative vectors match, determining that the additional utterance was spoken by the same user that is associated with the activated set of one or more warm words.

24. The system of claim 14, wherein the operations further comprise, when the additional utterance was spoken by a different user than the same user that is associated with the activated set of one or more warm words, suppressing performance of the respective action associated with the identified one of the warm words for controlling the long-standing operation.

25. The system of claim 14, wherein prompting the same user that is associated with the activated set of one or more warm words comprises identifying the different user that spoke the additional utterance.

26. The system of claim 14, wherein the operations further comprise:
  determining when the digital assistant stops performing the long-standing operation; and
  deactivating the set of one or more warm words.

* * * * *